United States Patent [19]

Johnston

[11] Patent Number: 4,763,488
[45] Date of Patent: Aug. 16, 1988

[54] PLATE HEAT EXCHANGER FOR SEPARATING VAPOR AND LIQUID PHASES

[75] Inventor: Anthony M. Johnston, Woollahra, Australia

[73] Assignee: University of Sydney, Sydney, Australia

[21] Appl. No.: 76,989

[22] Filed: Jul. 20, 1987

Related U.S. Application Data

[63] Continuation of Ser. No. 262,847, May 12, 1981, abandoned.

[30] Foreign Application Priority Data

May 26, 1980 [AU] Australia ............................... PE3717

[51] Int. Cl.[4] ............................................. F25B 33/00
[52] U.S. Cl. ......................................... 62/497; 62/476; 159/28.6; 159/DIG. 32; 203/22; 203/23; 165/167
[58] Field of Search ................... 165/166, 167; 62/476, 62/495, 497, 489, 513; 159/28.6, DIG. 31, DIG. 32; 203/22, 23

[56] References Cited

U.S. PATENT DOCUMENTS

| | | | |
|---|---|---|---|
| 1,056,385 | 3/1913 | Walker | 165/167 |
| 1,662,870 | 3/1928 | Stancliffe | 165/166 |
| 2,379,519 | 7/1945 | Hall | 203/22 |
| 2,392,021 | 1/1946 | Wildermuth | 165/167 |
| 2,562,739 | 7/1951 | Risberg | 159/28.6 |
| 2,960,160 | 11/1960 | Goodman | 159/28.6 |
| 3,150,028 | 9/1964 | Wennerberg | 165/166 |
| 3,398,091 | 8/1968 | Greatorex | 159/28 P |
| 3,399,708 | 9/1968 | Usher et al. | 159/28 P |
| 3,559,722 | 2/1971 | Schauls | 165/166 |
| 3,765,981 | 10/1973 | Rogers | 159/DIG. 31 |
| 3,928,983 | 12/1975 | Ainbinder et al. | 62/497 |
| 4,535,840 | 8/1985 | Rosman et al. | 165/167 |

*Primary Examiner*—Albert W. Davis, Jr.
*Assistant Examiner*—John K. Ford
*Attorney, Agent, or Firm*—Ladas & Parry

[57] ABSTRACT

A heat exchange device which is employed for separating components of different volatility from a solution containing the components and which has particular application as a heat exchanger/rectifier/generator in an absorption cycle refrigeration system. The device comprises a plurality of heat conductive plates which are stacked as laminations in face-to-face heat conductive relationship and a chamber is formed in the plates, the chamber defining a zone into which fluid is directed and in which liquid and vapor phases of the fluid can separate. First, second, third and fourth fluid flow channel regions are formed within the plates. The first channel region provides a passage through which the fluid is delivered to the chamber, the second channel region provides a passage for conveying the vapor phase of the fluid from the chamber, the third channel region provides a passage for conveying the liquid phase of the fluid from the chamber, and the fourth channel region provides a passage through which a heat exchange fluid is passed for transferring heat into the device.

19 Claims, 14 Drawing Sheets

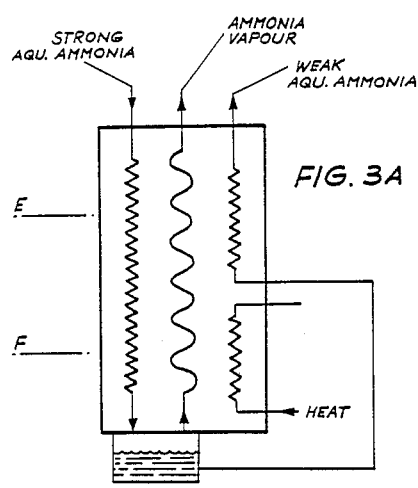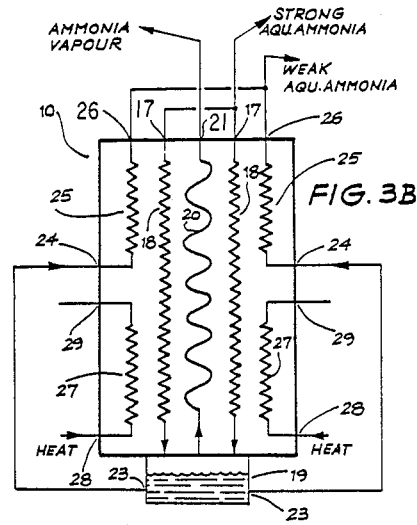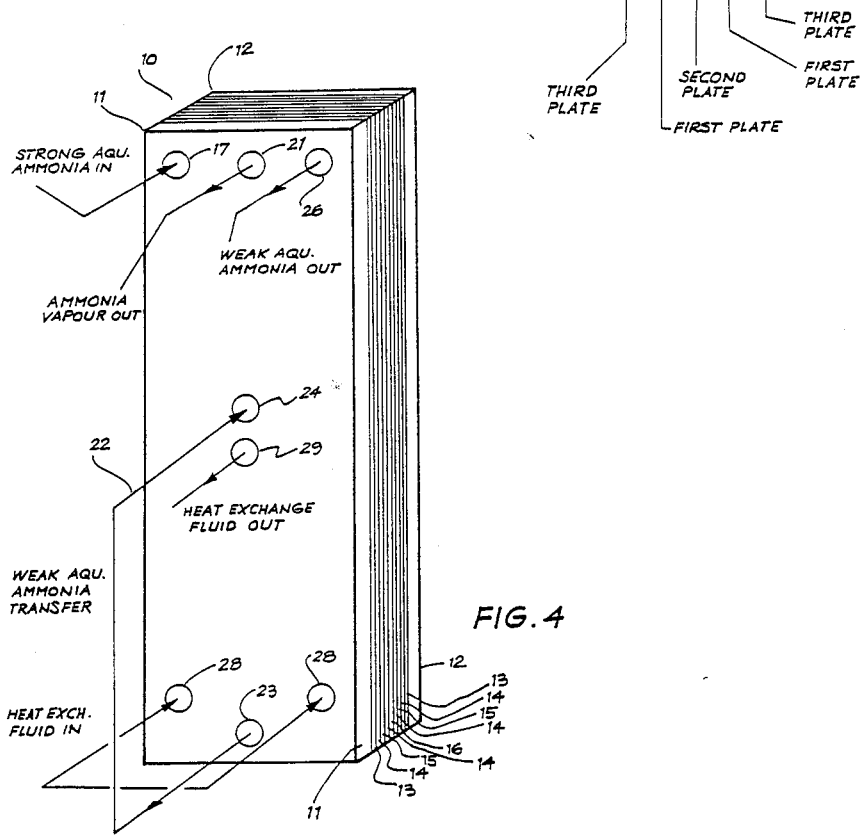

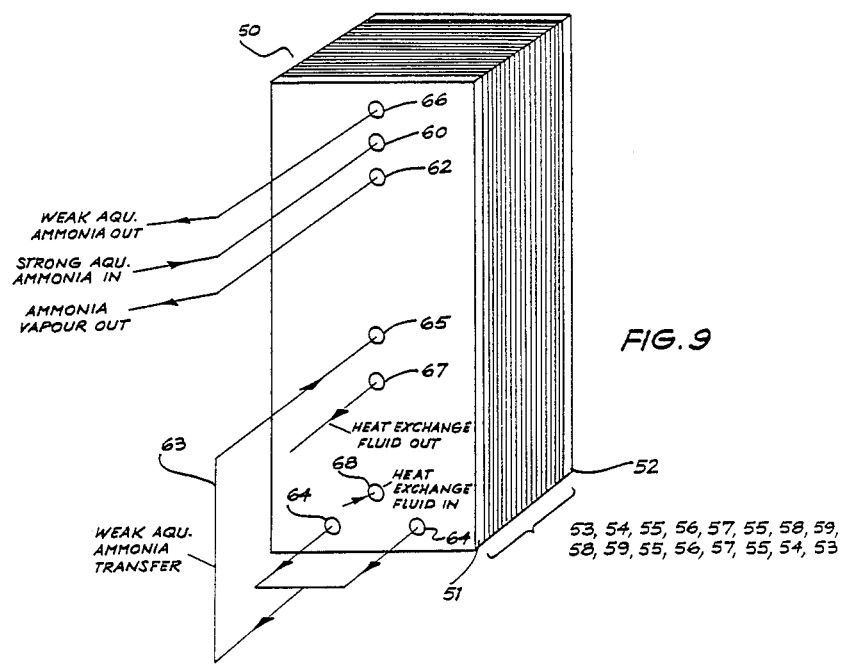
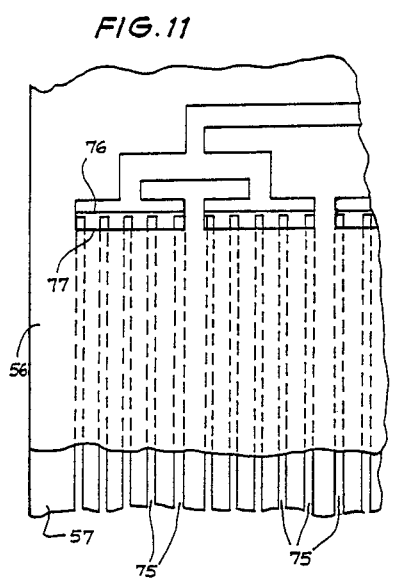
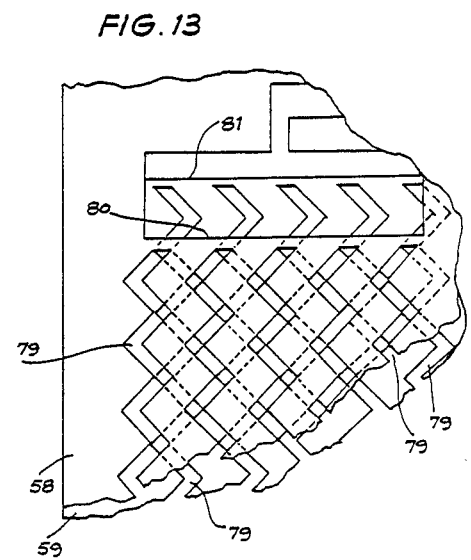

PLATE HEAT EXCHANGER FOR SEPARATING VAPOR AND LIQUID PHASES

This is a continuation of co-pending application Ser. No. 262,847 filed on May 12, 1981, now abandoned.

FIELD OF THE INVENTION

This invention relates to a heat exchange device and, in particular, to a device in which heat exchange is employed for separating components of different volatility from a solution containing those components.

BACKGROUND OF THE INVENTION

Two or more liquid components can be separated, if their volatilities are different, by the well known process of distillation. If the volatilities are widely different, simple flash distillation might give an adequately pure stream of the more volatile component or components, but otherwise the vapour phase must usually be rectified in a fractionating column. Within the fractionating column, counter-currently flowing vapour and liquid phases are intimately contacted, with the liquid reflux stream usually being provided by an external condenser which rejects heat to the surroundings.

The principal energy input to the distillation process is heat, which is applied to a boiler to drive off vapour which consists predominantly of the more volatile component or components. In many instances, such as in an absorption refrigeration cycle, it is desirable to utilise this heat as efficiently as possible; that is, to use as little heat as possible to produce the required degree of component separation. The strategy for so doing involves preheating the feed mixture with liquid and vapour from the boiler. For a flash process, this can reasonably be achieved using conventional equipment, although controlled splitting of the feed stream to contact the liquid and vapour streams separately would probably be required. If the vapour from the boiler must be rectified, however, the inconvenient step of incorporating a heat exchange surface into the fractionating column is required if heat is to be recovered from the vapour stream. In common practice, only recovery of heat from the liquid stream is undertaken and the energy efficiency of the rectification process is maximised by operating with as low a liquid reflux ratio as possible.

SUMMARY OF THE INVENTION

The present invention is directed to a heat exchange device which provides for participation of the vapour rectification process in heat exchange with liquid streams and which avoids the need to split the feed stream. Expressed in broad terms, the device comprises a number of plate elements (which may themselves consist of sub-plate elements) formed in such a way that a sequenced stack of the elements provides the required heat and mass transfer components in an integrated assembly.

The heat exchange device is distinguished from state-of-the-art distillation devices in that at least some of the heat and mass transfer components, including a rectification section, are integrated into a single assembly of the plate elements which are disposed substantially parallel to the fluid flow. In contrast, the plates in prior art fractionating columns are disposed substantially in planes perpendicular to the vapour flow and do not provide for heat exchange.

Also, the heat exchange device is distinguished from state-of-the-art parallel plate type heat exchangers in that vapour rectification can occur on or in one or more of the plate elements (or sub-plate elements), such elements incorporating or being in communication with at least one chamber in which separation of vapour and liquid phases can occur and from which the phases can be separately conveyed.

DEFINITION OF THE INVENTION

Broadly defined, the invention provides a heat exchange device comprising a plurality of heat conductive plates which are stacked as laminations in engaging relationship. A chamber is disposed in juxtaposed relationship to the plates or is formed within at least one of the plates, the chamber defining a zone in which, in use of the device, liquid and vapour phases of a fluid which is delivered to the device can separate. At least one first fluid flow channel region is formed in at least one of the plates and provides a passage through which the fluid can be passed during delivery of the fluid to the chamber. Also, at least one second fluid flow channel region is formed in at least one of the plates, such channel region communicating with the chamber and providing a passage for conveying a vapour phase of the fluid from the chamber. Additionally, at least one third fluid flow channel region is formed in at least one of the plates and provides a passage through which a liquid phase of the fluid can be conveyed during passing of the liquid phase of the fluid from the chamber. Ports extend into the laminated plate structure for conveying the fluid to the first channel region and for conveying the vapour and liquid phases of the fluid from the second and third channel regions respectively.

In use of the heat exchange device, a solution (i.e. said fluid) composed of components of different volatility is directed by way of one of the ports into the first channel region and it flows through that region toward the chamber. Vapour rises upwardly through the second channel region from the chamber and exits from the device by way of another port, with any condensate draining to the chamber in a direction counter to the vapour flow. Residual liquid is directed through the third channel region from the chamber and from the device via a port which communicates with the third channel region. Heat sufficient to cause vaporisation of (some of) the fluid which is directed into the chamber is derived at least partially from an external heat source. Such heat may be applied to the fluid when in the chamber, when passing toward the chamber from the first channel region or, preferably, during the passage of the fluid through the first channel region and into the chamber. In the latter case, a heating fluid may be directed through a fourth fluid flow channel region in the device from an external source. In every case, additional heat is transferred to the fluid in the first channel region from fluid passing through the second and third channel regions. That is sensible heat is conducted to fluid in the first channel region from liquid flowing through the third channel region, and latent heat of condensation plus some sensible heat is conducted to the first channel region from condensing vapour and vapour passing through the second channel region.

PREFERRED FEATURES OF THE INVENTION

In accordance with a preferred aspect of the invention, the first channel region is formed in a first plate or plates, the second channel region is formed in a second plate or plates, and both the third and the fourth channel regions are formed in a third plate or plates. Also, the first, second and third plates are all preferably formed with aligned chamber defining apertures, whereby the chamber extends through substantially the entire thickness of the plate stack, with cover plates being provided at each end face of the plate stack.

When the third and fourth channel regions are both formed in the one plate, the fourth channel region is preferably disposed adjacent the chamber defining aperture in that plate and the third channel region is located remote from the aperture. An external connection is then made between the (lower) liquid-containing portion of the chamber and the third channel region, although it is possible to arrange for an internal connection. Possible alternative arrangements are as follows:

(a) The third and fourth channel regions might be formed in separate (third and fourth) plates with the third channel region being located adjacent the chamber.

(b) As above suggested, three only channel regions might be provided, with heat being applied to the chamber or to the fluid proceeding from the first channel region to the chamber by means of an external or an internal connection.

(c) The third and fourth channel regions might both be formed on the same (third) plate, but with both such channel regions being located adjacent the chamber.

(d) The chamber might be constituted by a fifth channel region in which the fluid which is delivered to the device is stripped of the more volatile component by rising vapour. Such fifth channel region might be formed in one or more of the plates.

(e) The first and third channel regions might be formed on the same (first) plate and the fourth channel region might be formed on the same plate.

The device may be constructed with all of the plates which are located intermediate the cover plates being formed with channel regions. However it is preferred that spacer plates be located between each of the plates which are formed with the channel regions, the spacer plates each being formed with an aperture which matches and aligns with the chamber defining aperture in each of the channelled plates and the spacer plates being formed with holes which align with port defining holes in the channelled plates.

In accordance with a particularly preferred aspect of the invention, the heat exchange device comprises an arrangement wherein two of the first plates sandwich one of the second plates, a third plate is located outside each of the first plates, and a spacer plate is located between each of the first, second and third plates. Such arrangement is preferably repeated a number of times (say 5 to 50 times) within the one heat exchange device, so as to increase the capacity of the device. Corresponding plates within the device are connected in parallel.

The various plates may be clamped together, as laminations, in face-to-face relationship by bolts or straps or by an enveloping cage or by welding. Alternatively the plates may be bonded to one another by an adhesive (e.g. an epoxy resin) or by a metal (e.g. solder) having a relatively low melting point. The actual clamping method will depend largely on the size of the device and the pressure level to which inflowing fluid is subjected. However it is preferred that the plates be diffusion bonded to one another.

The channel regions in the various plates may be formed by etching or coining one or the other or both of the faces of each of the plates to a required depth. Alternatively, some or all of the channel regions in some or all of the various plates may be constituted by an arrangement of narrow slits extending into or right through the respective plates and, in such case, the spacer plates might need be provided to prevent mixing of fluids flowing through the various channel regions in adjacent plates. Also, the various plates may be constituted by sub-plates which are clamped together during assembly of the device.

The ports may be constituted by apertures which extend into the plates in a direction normal to the faces of the plates. However, other port arrangements are possible, including one in which the ports are constituted by channels which are formed in the various plates and which extend to a marginal edge of the plates for connection to a conduit.

APPLICATIONS OF THE INVENTION

The heat exchange device in accordance with the present invention has general application in the separation of two or more components of different volatility from a solution composed of or containing the components, separation being effected by vaporising the more (or most) volatile component using heat derived from an external source. However, the device has particular application as a heat exchanger/rectifier/generator in a refrigeration system which employs the absorption principle and, solely for convenience of reference, the heat exchange device is hereinafter described by way of example in such context with reference to the accompanying drawings.

BRIEF DESCRIPTION OF THE DRAWINGS

In the accompanying drawings,

FIG. 3A shows a schematic representation of a heat exchanger/rectifier/generator portion of the total arrangement shown in FIG. 2, FIG. 3B shows a further development of the arrangement which is illustrated in FIG. 3A, FIG. 4 shows a perspective view of a first embodiment of a heat exchange device which incorporates the arrangement shown in FIG. 3B, FIGS. 5, 6 and 7 illustrate first, second and third plate elements respectively which are incorporated in the device of FIG. 4.

FIG. 9 shows a perspective view of an alternative construction of the heat exchange device which embodies the arrangement shown in FIG. 3B, FIGS. 10 and 10A illustrate a pair of first subplate elements which are incorporated in the device of FIG. 9, FIG. 11 shows, on an enlarged scale, a cut-away view of a portion of the first sub-plate elements of FIGS. 10 and 10A, such elements being shown in superposed relationship and the portion shown being that which is encircled in FIGS. 10 and 10A, FIGS. 12 and 12A illustrate a pair of second sub-plate elements which are incorporated in the device of FIG. 9, FIG. 13 shows, on an enlarged scale, a cut-away view of a portion of the second sub-plate elements of FIGS. 12 and 12A, such elements being shown in superposed relationship and the portion shown being that which is encircled in FIGS. 12 and 12A, FIGS. 14 and 14A illustrate a pair of third subplate elements which are incorporated in the device of FIG. 9.

DETAILED DESCRIPTION OF THE INVENTION

Figure 1:
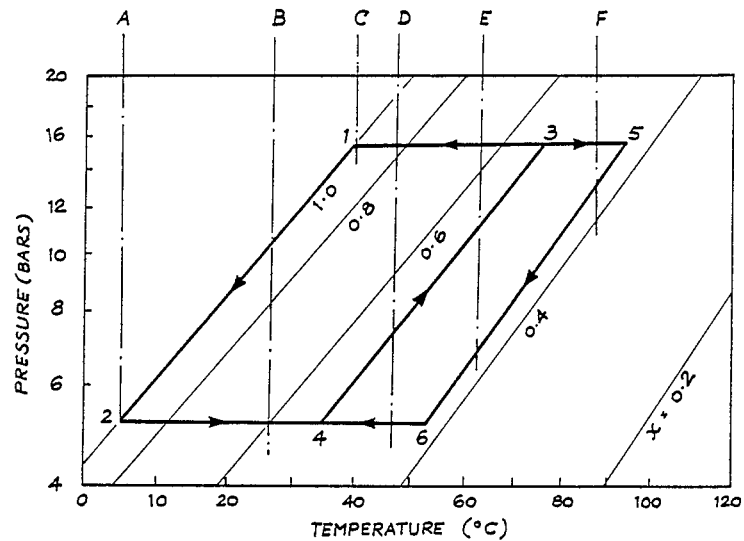
FIG. 1 shows an idealised P-T-x diagram for an absorption system refrigeration cycle.

Before proceeding to a detailed description of the preferred embodiment of the device according to the present invention, an efficient thermal contacting arrangement for an ideal single-stage absorption cycle is developed with reference to FIG. 1. This shows a P-T-x diagram for aqueous ammonia on which streams of the absorption cycle are marked. Each of the streams 25 is shown cut by a stroke (A, B, C, etc.) and, since each of the streams cut by a given stroke passes through a temperature range largely common to all the streams cut by that stroke, consideration is given to thermally contacting all streams cut by each stroke.

In traditional absorption cycle terminology, the heat exchange regimes characterising strokes A, B, C, etc. are as follows:

A—Evaporator
B—Refrigerant pre-cooler
C—Condenser
D—Absorber/Rectifier
E—Liquid Heat Exchanger/Rectifier
F—Generator/Rectifier The exchange in regimes A, B, and C presents few problems, involving two essentially pure streams and phase change, and these regimes are not further considered in any significant detail. However, practical complications arise in regimes D, E and F and these are now given closer scrutiny.

In regime D, heat is ideally exchanged between the following streams:

1. The absorber liquid stream 6-4, which is contacting countercurrently the vapour stream 2-6 and absorbing it, releasing both sensible and latent heat.
2. The strong (i.e., high ammonia concentration) solution stream 4-3, which is increasing in temperature.
3. The vapour stream 5-1, which is contacting countercurrently an internally established reflux stream as it is being rectified, releasing both sensible and latent heat.
4. The external sink stream (not shown in FIG. 1), which delivers the excess heat generated in this regime to the heat rejection device.

Thus, four streams, two of which themselves consist of two countercurrent streams exchanging heat and mass, must be thermally contacted. In regime E, the exchange occurs between:

1. The strong solution stream 4-3, which is increasing in temperature.
2. The weak (i.e., low ammonia concentration) solution stream 5-6, which is decreasing in temperature.
3. The vapour stream 5-1, which is being rectified as in regime D.

In this case two liquid streams, between which highly effective heat exchange is essential to good cycle performance, must also exchange heat with a vapour stream undergoing rectification.

In regime F, the exchange occurs between:

1. The generator liquid stream 3-5, which is boiling.
2. The weak solution stream 5-6, which is decreasing in temperature.
3. The vapour stream 5-1 which, once again, is being rectified.
4. The external heat supply stream (not shown in FIG. 1).

Figure 2:
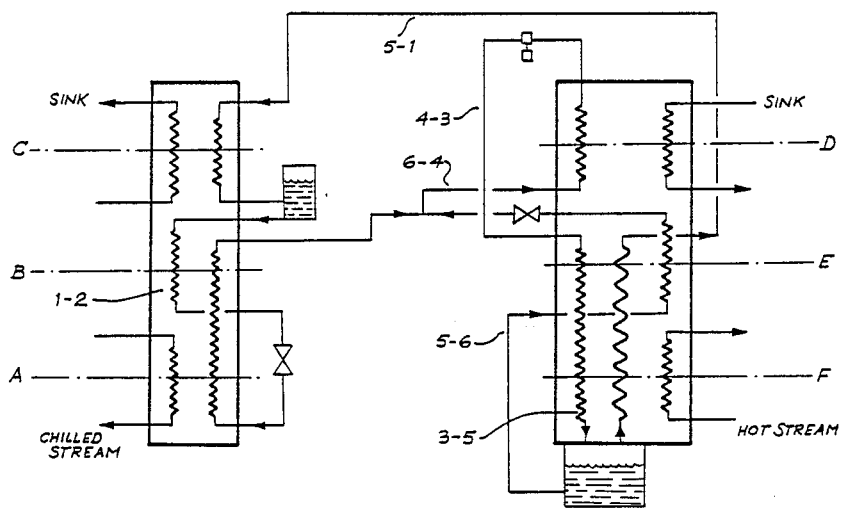
FIG. 2 shows a schematic representation of a practical arrangement for a single stage absorption cycle refrigeration system.

The ideal arrangement which can be derived from FIG. 1 can be considerably simplified, although this is not essential, without performance being unduly diminished from that of the ideal cycle, to the practical arrangement which is shown schematically in FIG. 2. The simplifications which are inherent in the practical arrangement are:

1. The strong solution stream 4-3 is eliminated from the regime D and the weak solution stream 5-6 from regime F, thereby transferring an additional heat transfer load to regime E.
2. Rectification of the vapour stream 5-1 can be eliminated from regime D, as, with the rerouting of stream 4-3 mentioned above, rectification can be completed within the regime E.
4. The absorber liquid stream 6-4 does not contact vapour stream 2-6 countercurrently. Rather the two streams are mixed and passed co-currently into regime D.

The practical benefits of the above described simplifications are considerable. Regime D particularly benefits as it simply consists of co-flowing liquid and vapour exchanging heat with the external sink stream, rather than the difficult situation of the ideal cycle, and, in regime F, a maximum of three streams contact, rather than four. The shift of load to regime E presents no particular difficulty.

The performance degradation resulting from the simplifications is not severe. Heat must be supplied to F at a higher average temperature, and heat is a little more difficult to reject from D. However, the predominant effect lowering the coefficient of performance of a practical cycle employing the arrangement of FIG. 2 from the ideal is resistance to heat transfer, each degree temperature differential in the liquid-to-liquid heat exchange of E diminishing performance by approximately 1–2 percent from the ideal.

For good absorption cycle performance, then, the constraints which must be observed for the heat exchange equipment are:

1. It should permit close temperature approach of the contacting streams, in view of the marked loss of performance with increasing temperature differentials. This means that it should be of compact construction, to avoid the unreasonable bulk which might otherwise be associated with close temperature approach, and it should contact the streams in a strictly countercurrent manner.
2. It should permit multiple service heat exchange (that is, exchange between more than two streams), preferably without the need for stream splitting, with one set of passages consisting of a vapour rectifier.

Further considerations which apply specifically to equipment for use in an ammonia-water absorption cycle are:

3. Ammonia and its solutions should not contact any common metal other than steel.
4. The cycle operates at relatively high pressures, a suitable safety valve setting being of the order of 25 bar (370 lbs per sq. inch).

Figure 5:
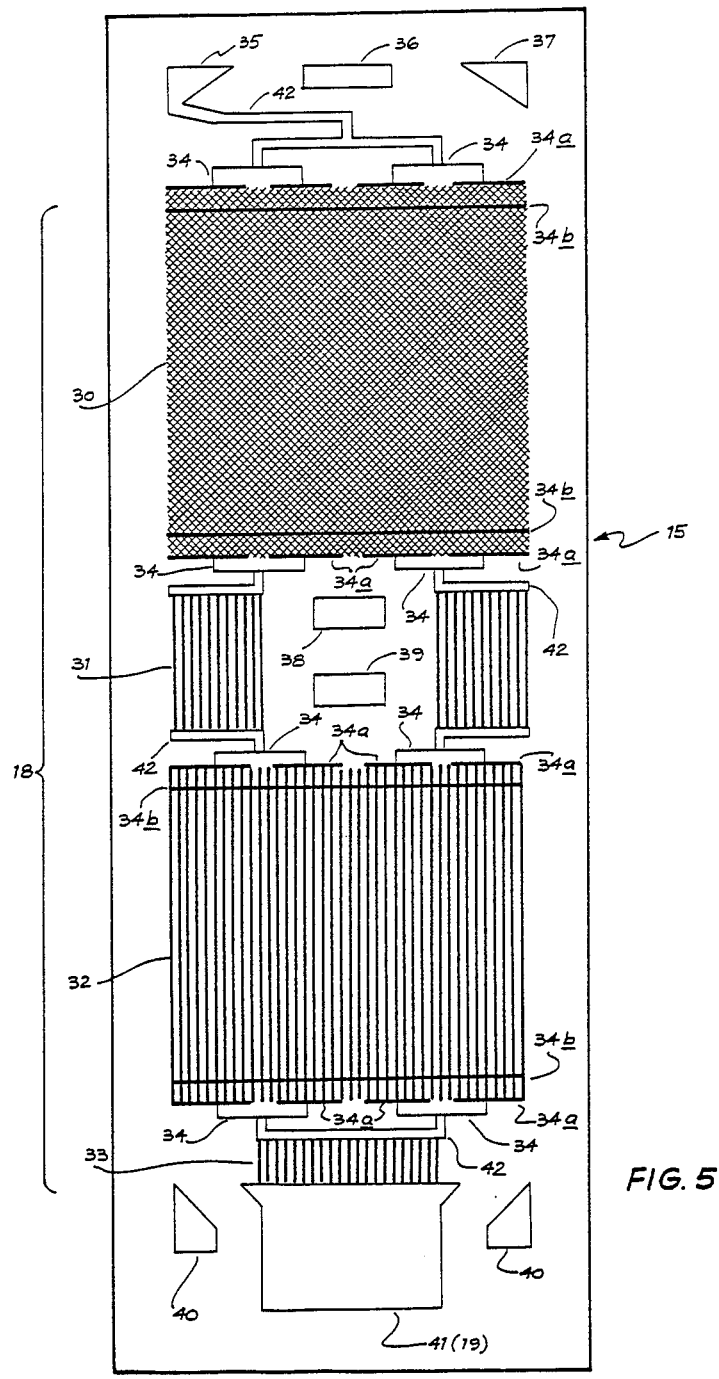
Figure 6:
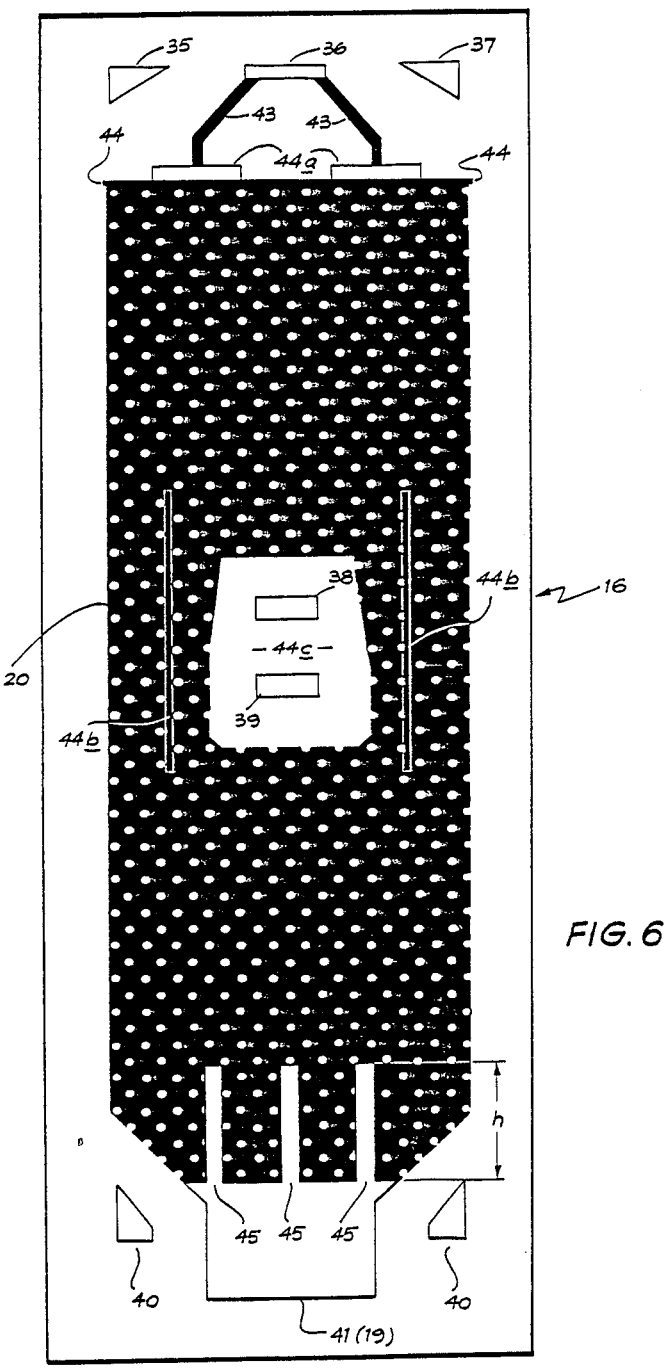
Figure 7:
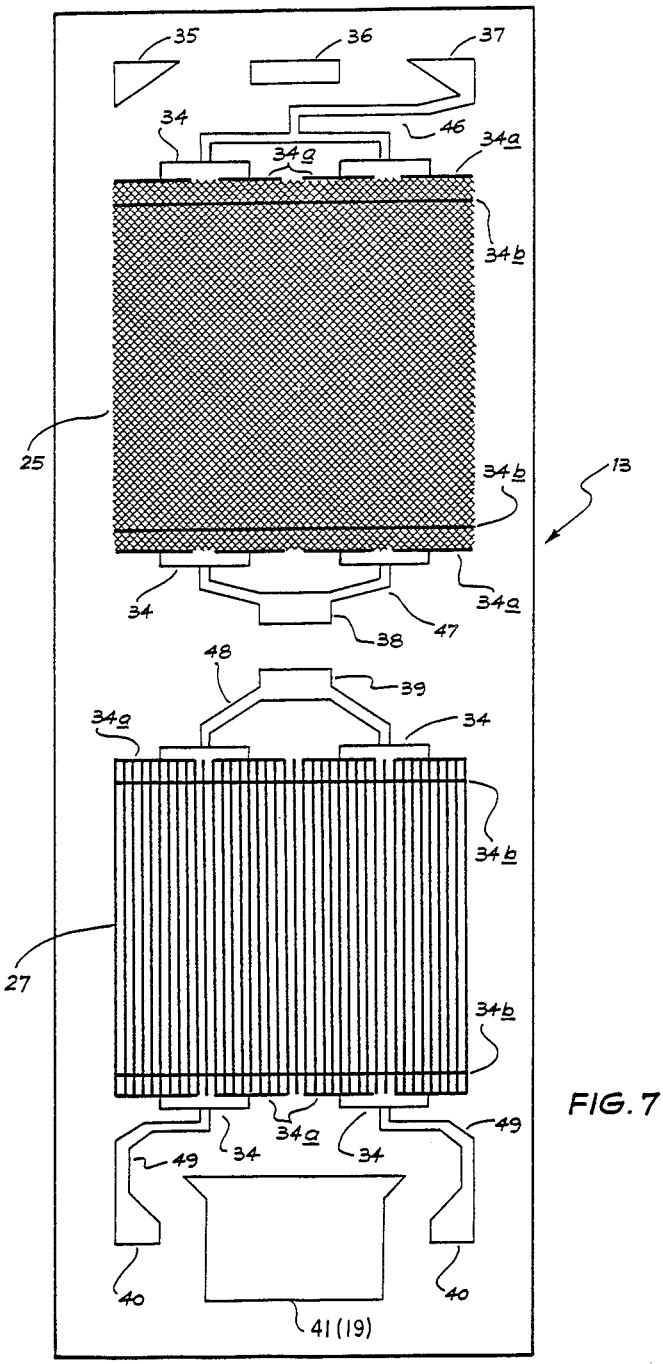

The device which is now to be described with reference to FIGS. 4 to 8 and, thereafter, with reference to FIGS. 9 to 15 seeks to satisfy the above constraints. The device constitutes the heat exchanger/rectifier/generator (i.e. embodies regimes E and F) which is shown in FIGS. 3A/B, but it will be appreciated that the device might readily be modified to incorporate regimes A, B, C and/or D. That is, an additional fluid flow channel region may be incorporated in each of the plate elements which are shown in FIGS. 5, 6 and 7, and which are to be hereinafter described, with appropriate porting to and from the additional channel regions being provided.

The device which is shown in FIG. 4 (hereinafter referred to simply as a "heat exchange device") comprises a unitary assembly 10 of eleven separate rectangular plates. The plates are stacked as laminations and are diffusion bonded one to another.

End or cover plates 11 and 12 are provided at each end of the stack and, as shown, one only of the end plates is ported to permit fluid flow conduit connections to the interior of the device. However, both of the end plates 11 and 12 may be correspondingly ported, or various ones of the ports may be provided in respective ones of the end plates. Alternatively but less conveniently, porting to the interior of the stack 10 may be provided through the sides of the stack. The porting arrangement is to be hereinafter described.

Located in order between the end plates 11 and 12 are:

A third plate element 13 (FIG. 7), a spacer plate 14 (FIG. 8), a first plate element 15 (FIG. 5), a spacer plate 14, a second plate element 16 (FIG. 6), a spacer plate 14, a first plate element 15, a spacer plate, and a third plate element 13. Thus, there is a single so-called second plate element 16, and there are two so-called first plate elements 15 and two third plate elements 13, the stack being symmetrical about the centrally positioned plate element 16. However, the stack might be arranged such that it is symmetrical about any other plate element or group of plate elements. Symmetry as such is not important, it being important only that adjacent plate elements carry counterflowing streams, as indicated in FIG. 3B.

The above described plate arrangement is shown in the drawings for the sake of simplicity, but it would be more usual for the arrangement to be repeated a number of times (say ten times) within the one stack. Then, using reference numerals only, a plate arrangement might be: plates 13-14-15-14-16-14-15-14-13-14-15-14-16-14-15-14-13--- etc.)

The function(s) performed by the various plate elements can best be seen from the schematic representation as shown in FIG. 3B and from FIG. 4, the former Figure omitting the various spacer plates 14 for convenience of description.

A strong aqueous ammonia solution (i.e. high ammonia concentration) is delivered to the device 10 by way of a port 17 and it flows downwardly through a first channel region 18 in the first plate elements 15 to enter a chamber 19 which is formed by an aperture within each of the plate elements and the spacers 14. Ammonia vapour which rises from the chamber passes upwardly through a second channel region 20 in the second plate element 16 and exits from the device by way of a port 21. Any condensate which forms in the second channel region 20 gravitates back to the chamber 19. The residual weak aqueous ammonia solution is conveyed from the chamber 19, by way of an external conduit 22 which couples with ports 23 and 24, and such solution is directed upwardly through a third channel region 25 in each of the third plate elements 13. The weak solution exits from the device by way of a port 26. Heat for vapourising at least a portion of the ammonia in the fluid stream in channel region 18 is obtained from a heating fluid which is directed through a fourth (lower) channel region 27 in each of the third plate elements 13, and further heat is transferred through the device to the fluid stream in channel region 18 from the vapour stream in channel region 20 and from the liquid stream in channel region 25. The heating fluid which is passed through the channel regions 27 is obtained from an external source (e.g. a solar energy collector system) and is directed into and from the device 10 by way of ports 28 and 29.

The first plate element 15 is shown in FIG. 5 and it comprises a stainless steel plate which has both of its faces etched to form, in each face, the first fluid flow channel region 18. Although one face only of the plate element 15 is illustrated in FIG. 5, both of the (obverse and reverse) faces of the plate are correspondingly etched. Each face of the plate element 15 is etched (where indicated by lines and hatching) to a depth of approximately 0.25 mm in regions 30, 31, 32 and 33 and for its full depth in manifold regions 34, 34a and 34b. The etched portion of the region 30 of the plate element comprises a series of intersecting diagonal lines which define intervening unetched "hills", and the etched portion of the regions 31 to 33 comprise vertically extending lines which separate unetched "hills". The plate element 15 is fully etched or otherwise apertured to produce ports 35, 36, 37, 38, 39 and 40 which respectively align with the ports 17, 21, 26, 24, 29 and 28 in the end plate 11. Also, the plate is apertured as indicated by numeral 41 to form a portion of the chamber 19.

The unetched area of each face of the plate element 15 (including "hills" between etched "valleys" is planar and, in assembly of the device, such area of the plate element is diffusion bonded to an adjacent plate so that unwanted fluid migration into or from the etched channel regions does not occur. The wanted flow of strong aqueous ammonia is conveyed from the port 35 to the etched region 18 and between the regions 30 to 33 by way of slit-like channels 42.

The second plate element 16 is detailed in FIG. 6 and it too comprises a stainless steel plate which has each of its (obverse and reverse) faces etched over a major portion of its area to form, in each face, the second fluid flow channel region 20. The plate is etched to a depth of approximately 1.0 mm over the shaded areas whereby circular unetched "hills" are created and, as in the case of the previously described plate, for the full thickness of the plate in port regions 35 to 40. Also, etched channels 43 extend from the port 36 to fully-etched regions 44 by way of etched manifold regions 44a. Additionally, fully etched slits 44b are formed in the plate element adjacent an unetched central region 44c. As in the case of the first plate element, the second plate element 16 is formed with a chamber defining aperture 41 and, additionally, with slits 45 which extend from the aperture 41 into the etched channel region 20. The slits have a height h which is greater than the capillary rise height in the region 20 of the liquid condensate draining from the region 20 in use of the device. The purpose of the slits 45 is to inject vapour into the second channel region above the capillary rise height of liquid in that region. As previously stated, ammonia vapour passes upwardly through the channel region 20 to exit through the port 36, and condensate gravitates back to the chamber 19 through the channel region 20.

The unshaded and unported area of each face of the plate element 16 forms a planar surface which, as in the case of all other plate elements, is diffusion bonded to adjacent plates.

The third plate element 13 is shown in FIG. 7 and is similar to the first plate element 15. However, the obverse face only of the third plate element 13 has two separate regions 25 and 27 which are etched to a depth of approximately 0.25 mm, and the reverse face of the plate is not etched. As in the previous cases, the etched "valleys" are shown shaded.

The channel region 25 is that through which the weak aqueous ammonia solution flows and it is connected in series with the ports 37 and 38 by channels 46 and 47. Similarly, the etched channel region 27 is that through which the heat supply fluid flows, and it is connected in series with the ports 39 and 40 by channels 48 and 49. Connections between the region 25 and the channels 46, 47 are made by way of etched manifolds 34 and 34a, as in the case of plate 15 (FIG. 5), and similar connections are made between the region 27 and the channels 48, 49.

Figure 8:
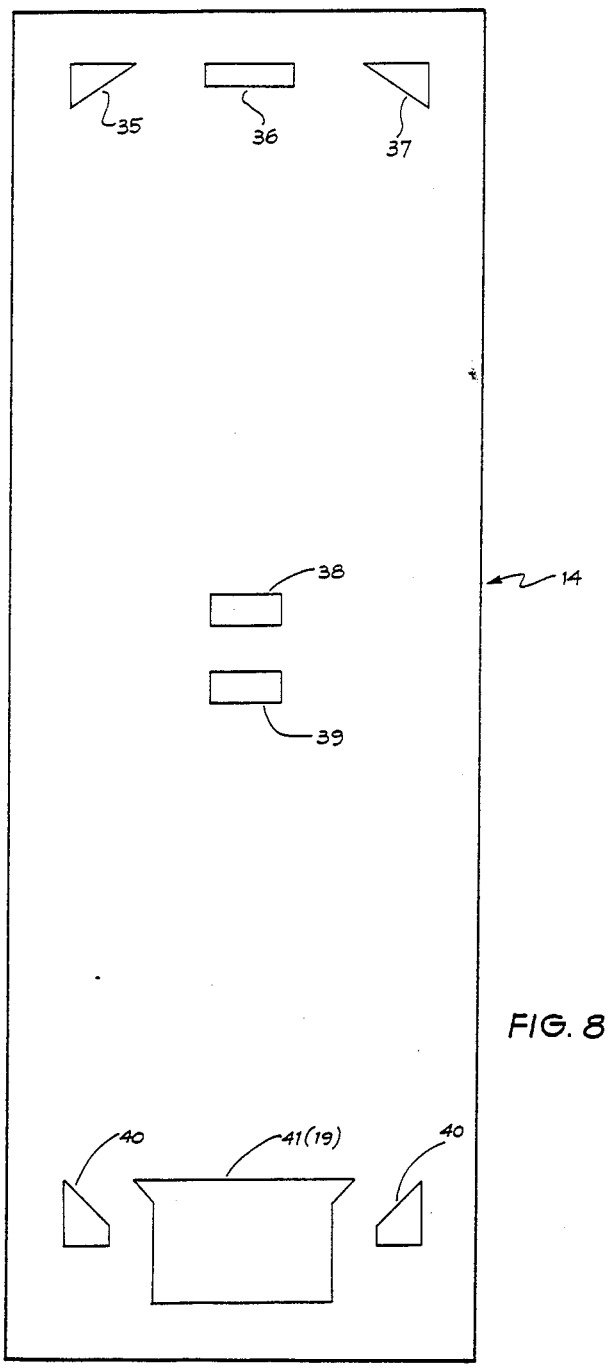
FIG. 8 shows a spacer plate which is incorporated in the device of FIG. 4.

FIG. 8 shows the spacer plate 14 which is located between each of the plate elements 13, 15 and 16. The spacer plate is formed only with ports 35 to 39 to permit fluid flow to or from the relevant etched plates and with the chamber (19) defining aperture 41.

When formed with channel regions which are etched to the above stated thickness, the plates may each have a total thickness as follows:

First and third plate elements (15 and 13)—1.0 mm.
Second plate element (16)—3.0 mm.
Spacer plates (14)—1.0 mm.
End plates (11 and 12)—6.0 mm.

The dimensions of the plates might typically be:
Width—10.5 cm
Height—30.0 cm

With plates so dimensioned and having the stated etch penetration depth, and with the described plate arrangement repeated five times within the stack, the device is appropriate to an absorption cycle refrigeration system which has a 1.0 kilowatt cooling capacity. However, it will be appreciated that the various dimensions, etch patterns and porting configuration etc. will vary with the duty requirements of a given device.

Reference is now made to FIGS. 9 to 15 of the drawings which show a second embodiment of the heat exchange device. The device which is illustrated in FIGS. 9 to 15 is similar to that which has previously been described and it embodies the features of the invention which are illustrated schematically in FIG. 3B.

In essence, the device as shown in FIGS. 9 to 15 differs from that as shown in FIGS. 4 to 8 only to the extent that first, second and third pairs of sub-plate elements are employed instead of the corresponding (single) first, second and third plate elements which are incorporated in the device shown in FIG. 4, and to the extent that the fluid flow channel regions in the various sub-plate elements are constituted by slits which penetrate the full thickness of the sub-plate elements.

The heat exchange device which is illustrated in FIG. 9 comprises a unitary assembly 50 of eighteen rectangular plates which are stacked as laminations and which are diffusion bonded one to another. As will be hereinafter described, the heat exchange device 50 incorporates fluid flow channel regions which are indicated in FIG. 3B by the numerals 18, 20, 25 and 27, and it incorporates dual chambers which have the same function as the single chamber which is indicated by numeral 19 in FIG. 3B.

End or cover plates 51 and 52 are provided at each end of the stack 50, and the end plate 51 is ported in a manner which is to be hereinafter described to accommodate fluid delivery to and from the interior of the stack.

Located in order between the end plates 51 and 52 are: a pair of third sub-plate elements 53 and 54 (FIGS. 14 and 14A), a spacer plate 55 (FIG. 15), a pair of first sub-plate elements 56 and 57 (FIGS. 10 and 10A), a spacer plate 55, two pairs of second sub-plate elements 58 and 59 (FIGS. 12 and 12A), a spacer plate 55, a pair of the first sub-plate elements 56 and 57, a spacer plate 55, and a pair of the third sub-plate elements 53 and 54. However, as in the case of the first embodiment of the invention, it will be appreciated that the illustrated stack arrangement as shown in FIG. 9 would normally be repeated a number of times, say 10 or 20 times, in order to increase the capacity of the device and, using reference numerals only, a second-order stack might be composed of plates 51-53-54-55-56-57-55-58-59-55-56-57-55-53-54-55-56-57-55-58-59-58-59-55-56-57-55-54-53-52.

The pair of first sub-plate elements 56 and 57 together correspond with and perform the same function as the first plate element 15 as previously described in the context of the first embodiment of the invention. Similarly, the second pair of sub-plate elements 58 and 59 are together equivalent to the previously described second plate element 16, and the third pair of sub-plate elements 53 and 54 are together equivalent to the previously described third plate element 13. All of the sub-plate elements 53, 54 and 56 to 59 are formed from stainless steel.

Consideration is now given to the operation of the device as shown in FIG. 9 in the context of the device as illustrated in a schematic sense in FIG. 3B. A strong aqueous ammonia solution is delivered to the device 50 by way of a portion 60 and the solution flows downwardly through first channel regions 18 in the first sub-plate elements 57 to enter chambers (identified by numeral 19 in FIG. 3B) which are formed by two apertures 61 in each of the sub-plate elements. Ammonia vapour which rises from the chambers 61 passes upwardly through second channel regions 20 in the second sub-plate elements 58 and 59 and exits from the device by way of a port 62. Any condensate which forms in the second channel regions 20 gravitates back to the chambers 61. The residual weak aqueous ammonia is conveyed from the chamber 61, by way of an external conduit 63 which couples with ports 64 and 65, and such solution is directed upwardly through a third channel region 25 in the third sub-plate elements 54. The weak solution exits from the device by way of a port 66. Heat for vapourising at least a portion of the ammonia in the fluid steams in channel regions 18 is obtained from heating fluid which is directed through fourth (lower) channel regions 27 in the third sub-plate elements 54. The heating fluid is directed into and from the device by way of ports 67 and 68.

The various sub-plate elements and the spacer plate element are now described specifically with reference to FIGS. 10 to 15. All of the elements have the same peripheral dimensions, and all of the elements are provided with aperture defining ports 69, 70, 71, 72, 73 and 74 which align respectively with the ports 66, 60, 62, 65, 67 and 68 in the end plate 51. At this point it should also be mentioned that the ports 64 in the end plate 51 align with the lower level of the chamber-defining apertures 61 in the various plate elements.

The channel regions 18 in the first sub-plate element 57 (FIG. 10A) comprise two groups of longitudinally extending slits 75 which pass through the thickness of the plate and extend for a major portion of the length of the plate. The slits 75 open into the chamber-defining aperture 61 adjacent the lower end of the plate, and manifolds 76 are located adjacent the upper ends of the groups of slits. However, the manifolds do not actually communicate with the slits, such communication being effected only when the other first sub-plate element 56 is laminated against the element 57. Thus, as can be seen from a comparison of FIGS. 10 and 10A, the manifolds 77 in the element 56 have a greater depth than the manifolds 76 in the plate 57 and, when the two sub-plate elements are laminated, the respective manifolds overlap each other to provide for the desired fluid passage communication between the manifolds 76, 77 and the slit-form fluid channels 18. The overlapping relationship of the manifolds is shown in FIG. 11, which depicts the portions of the elements 56 and 57 which are encircled in FIGS. 10 and 10A.

Channels 78 are formed in the two plate elements 56 and 57 for feeding strong aqueous ammonia to the manifolds 76, 77 and thence to the chamber regions 18 from the inlet port 70.

Figure 12:
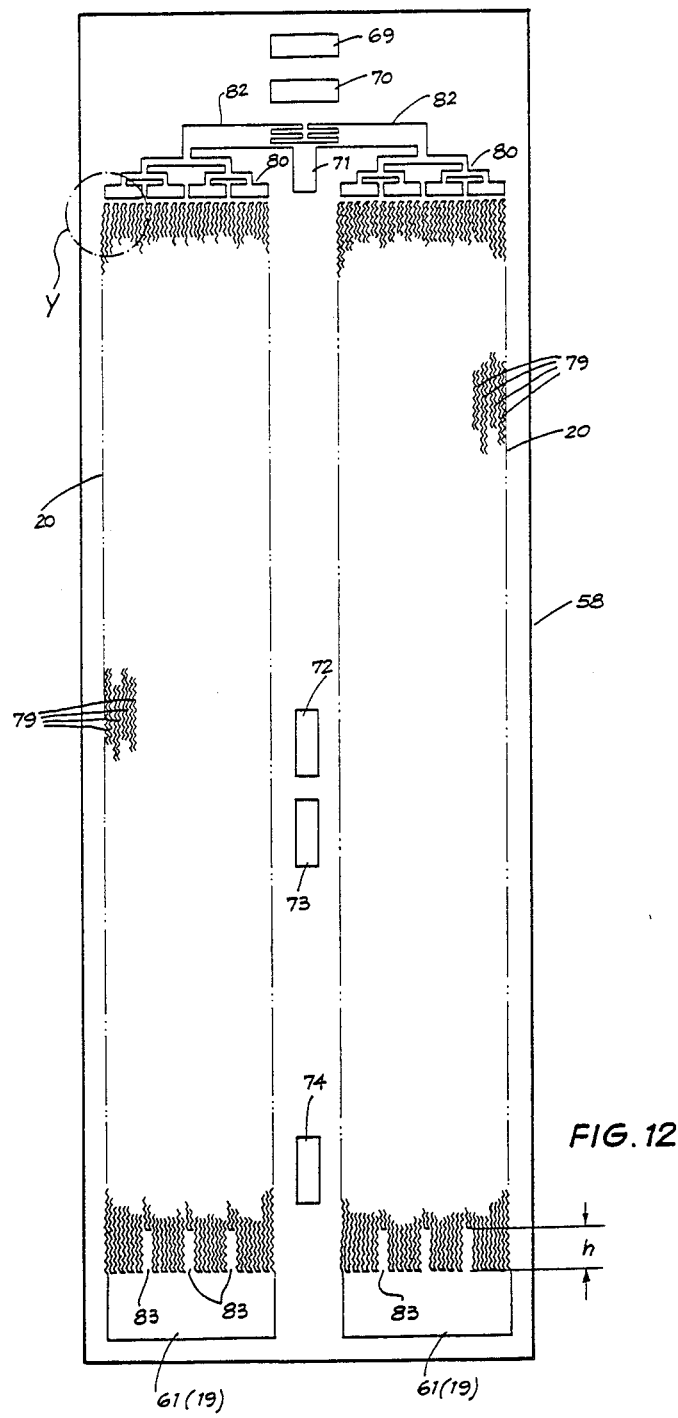
Figure 12A:
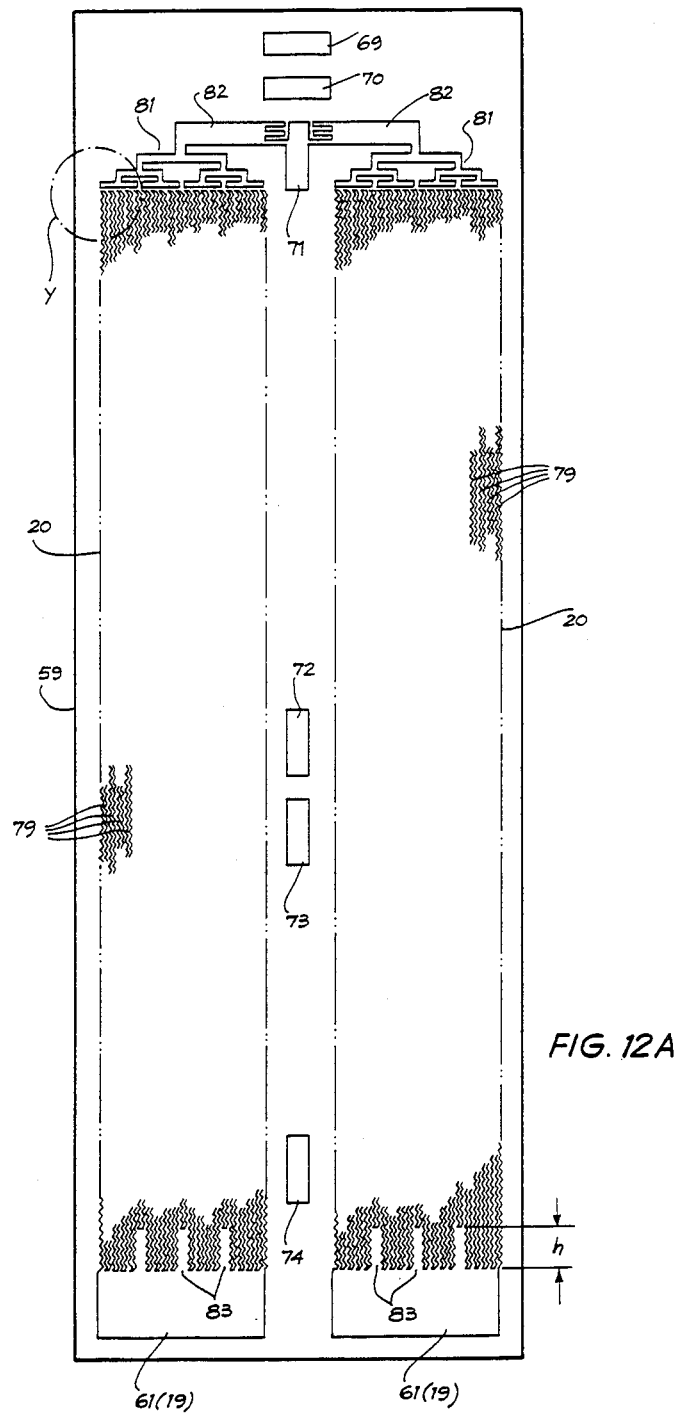

The second sub-plate elements 58 and 59 are shown in FIGS. 12 and 12A and each of the elements has zig-zag shaped slits 79 which extend generally in the longitudinal direction of the plate elements and which define the second fluid flow channel regions 20. The slits 79 penetrate the full thickness of the two sub-plate elements and open into the chamber-defining apertures 61.

The respective groups of zig-zag shaped slits in the plate elements 58 and 59 are displaced relative to each other so that, when the two plate elements are superimposed, the apices of the slits 79 align in the manner shown in FIG. 13 (which depict the portions of the elements shown encircled in FIGS. 12 and 12A) whereby fluid streams in the overlying channel regions 20 can be intimately contacted.

Manifolds 80 and 81 are positioned adjacent the upper ends of the channel regions 20 in the respective elements 58 and 59 and, as in the case of the first sub-plate elements, the manifolds do not actually communicate with the slits. Rather, communication is provided by laminating the elements 58 and 59 with the manifolds 80 and 81 overlapping each other in the manner shown in FIG. 13.

Channels 82 are formed in both of the sub-plate elements 58 and 59 for conveying to the outlet ports 71 ammonia vapour which rises through the channel regions 20 and passes into the manifolds 80 and 81.

Slits 83 are formed in both of the elements 58 and 59 and extend upwardly into the channel regions 20 from the chamber-defining aperture 61. The slits have a height h which is greater than the capillary rise height in the region 20 of the liquid condensate draining from the region 20 in use of the device. As previously stated, in use of the device, ammonia vapour passes upwardly through the channel regions 20 from the chamber defining apertures 61 to exit through the port 71, and condensate gravitates back to the chambers through the channel regions 20.

Figure 10:
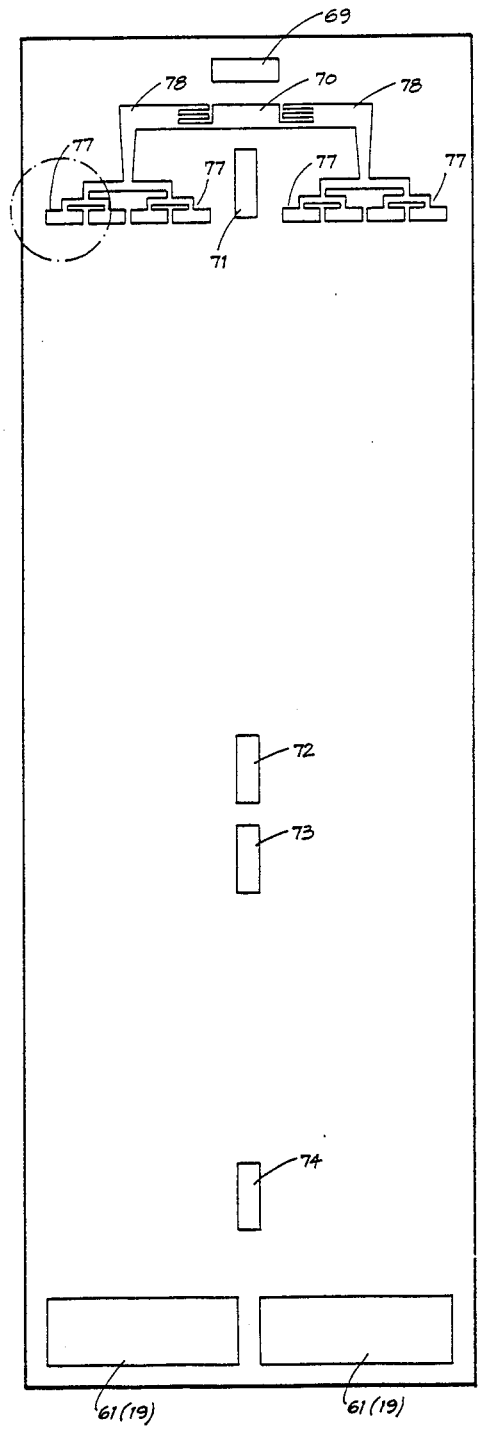
Figure 10A:
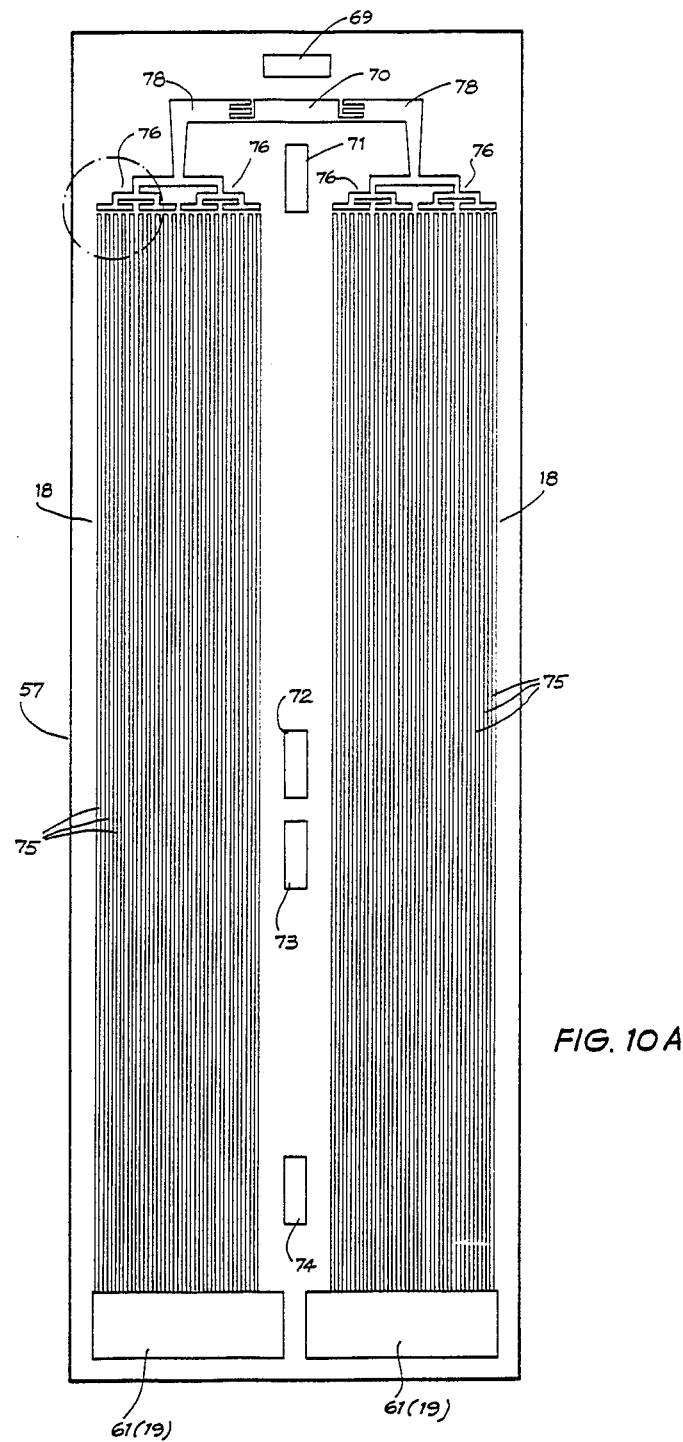
Figure 14:
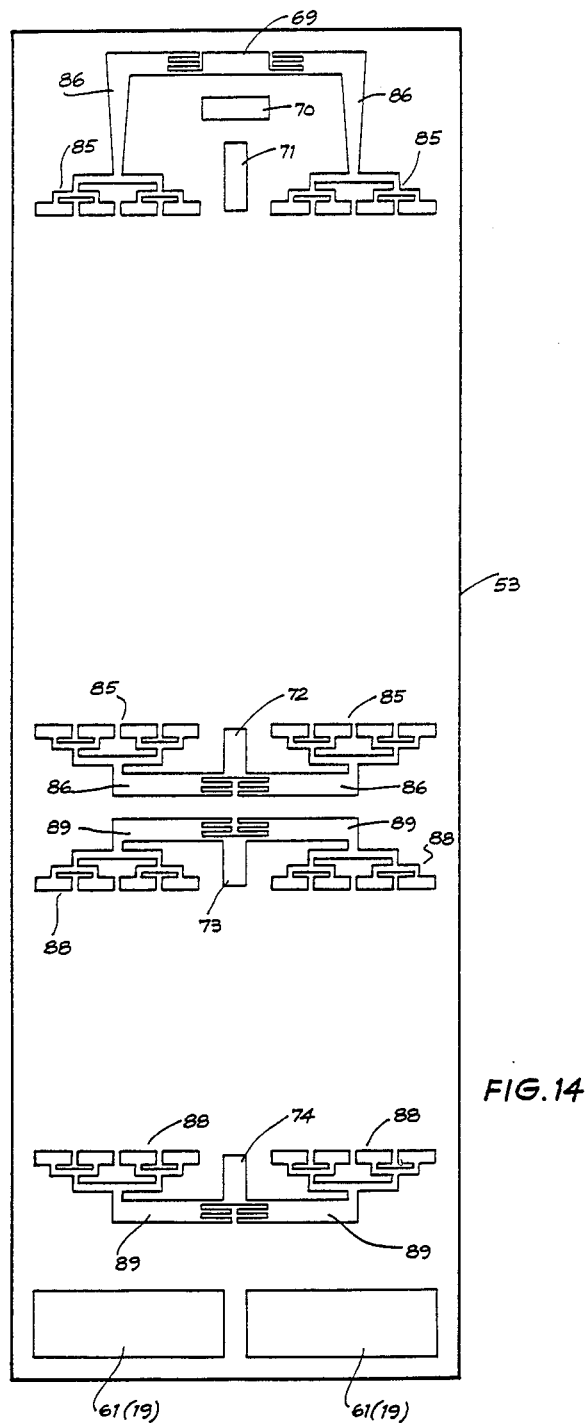
Figure 14A:
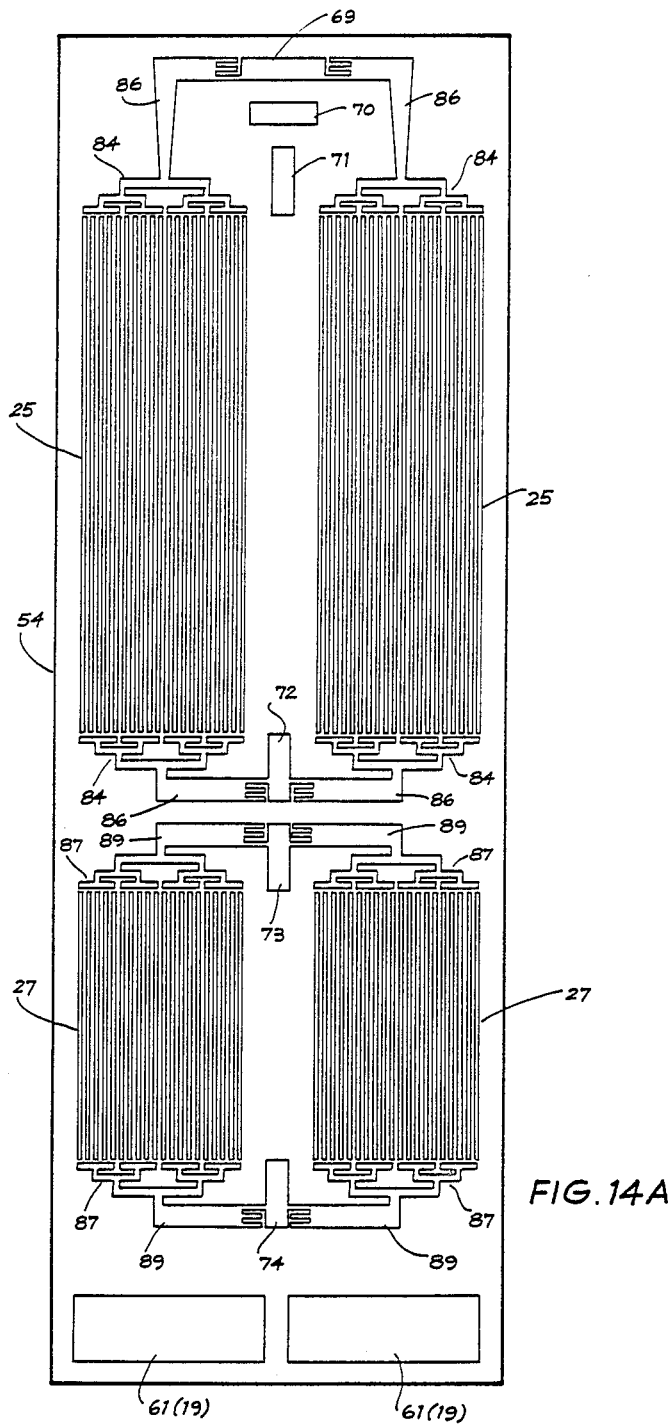

The third sub-plate elements 53 and 54 are now described with reference to FIGS. 14 and 14A, these elements being similar to the first sub-plate elements as illustrated in FIGS. 10 and 10A. However, the element 54 is formed with two separate channel regions 25 and 27 and both of the elements 53 and 54 are formed with manifolds to accommodate the dual channel regions. Also, the channel regions 25 and 27 do not communicate (at least directly) with the chamber-defining ports 61.

The channel region 25 is that through which the weak aqueous ammonia solution flows and it is connected in series with the ports 69 and 72 by manifolds 84, 85 and channels 86. The channel region 27 is that through which heat supply fluid flows and it is connected in series with the ports 73 and 74 by manifolds 87, 88 and channels 89.

Figure 15:
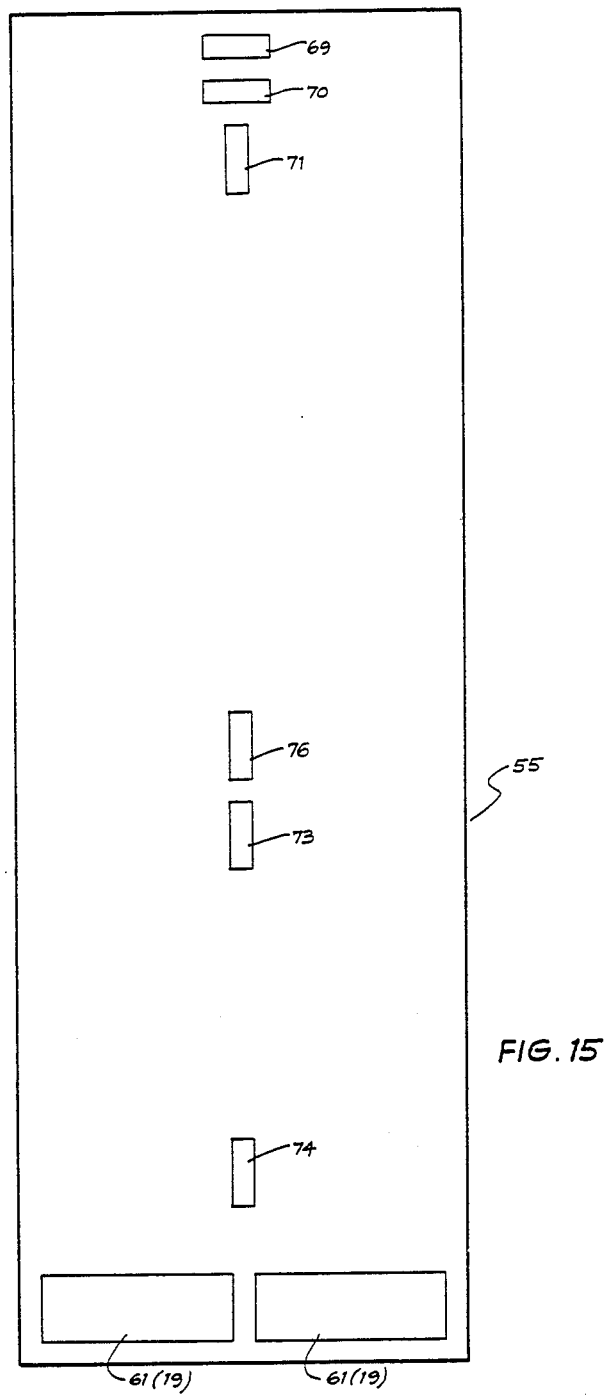
FIG. 15 shows a spacer plate which is incorporated in the device of FIG. 9.

FIG. 15 shows the spacer plate which is located between the various pairs of sub-plate elements, and it can be seen from FIG. 15 that the spacer plate is formed only with the chamber-defining ports 61 and with ports 69 to 74 to permit fluid flow to or from the relevant sub-plate elements as previously described.

The dimensions of the above described sub-plates and spacer plate elements might typically be -
Width—20 cm
Height—60 cm
Thickness—
    element 53—1.0 mm
    element 54—0.3 mm
    element 55—1.0 mm
    element 56—1.0 mm
    element 57—0.3 mm
    element 58—1.5 mm
    element 59—1.5 mm A heat exchange device constructed with plate elements having the above dimensions and having a plate arrangement as shown in FIG. 9 repeated fifteen times is suitable for use in an absorption cycle refrigeration system which has a working capacity of ten Kilowatts.

What is claimed is:

1. In a heat exchange system wherein a fluid is subjected to heat sufficient to cause separation of more and less volatile components of the fluid into a substantially pure vapor phase and a liquid phase and wherein the vapor phase of the fluid is rectified; a heat exchange device, first delivery means for delivering the fluid within the system to the heat exchange device and second and third delivery means for returning the vapor and liquid phases of the fluid to the system from the heat exchange device; the heat exchange device comprising:
  (a) a plurality of flat heat conductive metal plates stacked as lamination in face-to-face heat conductive relationship and bonded one to another;
  (b) a chamber formed by superpositioning apertures within the plates, the chamber defining a zone which receives the fluid and the zone having a configuration permitting separation of the liquid and vapor phases of the fluid under the influence of gravitational forces;
  (c) at least one first fluid channel means formed in at least one of the plates and defining first passage means for delivering the fluid to the chamber;
  (d) at least one second fluid channel means formed in at least one of the plates, the second fluid channel means communicating directly with the chamber, extending upwardly from the chamber, defining second passage means for conveying the vapor phase of the fluid upwardly from the chamber and providing for rectification of the fluid therein, and the second passage means being located adjacent the first fluid channel means and being adapted to accommodate liquid condensate which results from condensation of the vapor phase during rectification and the to permit draining of the condensate back into the chamber;

(e) at least one third fluid channel means formed in at least one of the plates, being located adjacent the first fluid channel means and defining third passage means for removing the liquid phase of the fluid from the chamber; and (f) a plurality of ports extending into the stack of plates for directing the fluid to the first channel means from the first delivery means and for directing the vapor and liquid phases of the fluid into the second and third delivery means from the second and third channel means respectively, the first, second and third fluid channel means being orientated in a direction parallel to one another whereby the vapor and liquid phases of the fluid in the second and third fluid channel means flow counter to the fluid in the first fluid channel means and the fluid in the first fluid channel means receives heat by counter current thermal contact with the vapor and liquid phases of the fluid in the second and third fluid channel means, and the fluid channel means in each plate being formed within the thickness of the plate by removing a portion of the metal from the plate in a manner such that some metal is left within each channel means for the full thickness of the plate and adjacent plates are bonded in face-to-face contact at points over a major portion of the surface area of the plates.

2. A device as claimed in claim 1 wherein at least one fourth fluid flow channel means is formed in at least one of the plates, the fourth channel means providing a passage through which a heat exchange fluid can be passed for transferring heat into the device.

3. A device as claimed in claim 2 wherein the fourth fluid flow channel region is disposed adjacent the chamber.

4. A device as claimed in claim 1 wherein the first fluid flow channel means is in direct fluid flow communication with the chamber.

5. A device as claimed in claim 1 wherein the third fluid flow channel means is spaced-apart from the chamber and wherein the third fluid flow channel means is connected in fluid flow communication with the chamber by a conduit.

6. A device as claimed in claim 1 including at least one first plate in which a said first fluid flow channel means is formed, at least one second plate in which a said second fluid flow channel means is formed and at least one third plate in which a said third fluid flow channel means is formed, a first said plate being interposed between respective ones of the second and third plates.

7. A device as claimed in claim 6 wherein each said third plate has formed therein a fourth fluid flow channel means the fourth channel means providing a passage through which a heat exchange fluid can be passed for transferring heat into the device.

8. A device as claimed in claim 6 wherein spacer plates are interposed as laminations between said first, second and third plates.

9. A device as claimed in claim 1 and including end plates between which said plurality of heat conductive plates are located.

10. A device as claimed in claim 1 wherein each of the plates is formed with at least one aperture which, when the plates are laminated, defines said chamber.

11. A device as claimed in claim 1 wherein the plates are diffusion bonded one to another.

12. A device as claimed in claim 2 wherein said fluid flow channel means are formed as recesses within but do not extend through the plates.

13. A device as claimed in claim 2 wherein said fluid flow channel means are formed as recesses which extend through, the plates.

14. A device as claimed in claim 2 wherein said fluid flow channel means are formed as recesses at least some of which extend through the plates.

15. A device as claimed in claim 1 wherein said plates which contain the fluid flow channel means are formed with manifold regions, the manifold regions comprising recesses which intercommunicate with the channel means and respective ones of the ports.

16. A device as claimed in claim 1 wherein each second fluid flow channel means follows a tortuous path through at least one of the plates.

17. A device as claimed in claim 1 wherein at least one slit is formed in at least one of the plates, the slit extending from the chamber and communicating with the second fluid flow channel means and the slit having a longitudinal length which extends to a height which is greater than the capilliary rise height within the channel means of liquid condensate which, in use of the device, drains into the chamber from the second channel means.

18. A device as claimed in claim 1 wherein each of the plurality of heat conductive plates is composed of a pair of sub-plates.

19. A device as claimed in claim 12 wherein said fluid flow channel means are formed as recesses within the obverse and reverse sides of the plates.

* * * * *